Sept. 15, 1970   A. J. PROCOP   3,528,732
GATE CONSTRUCTION FOR A MOVING PICTURE PROJECTOR
Filed Sept. 19, 1966   2 Sheets-Sheet 1
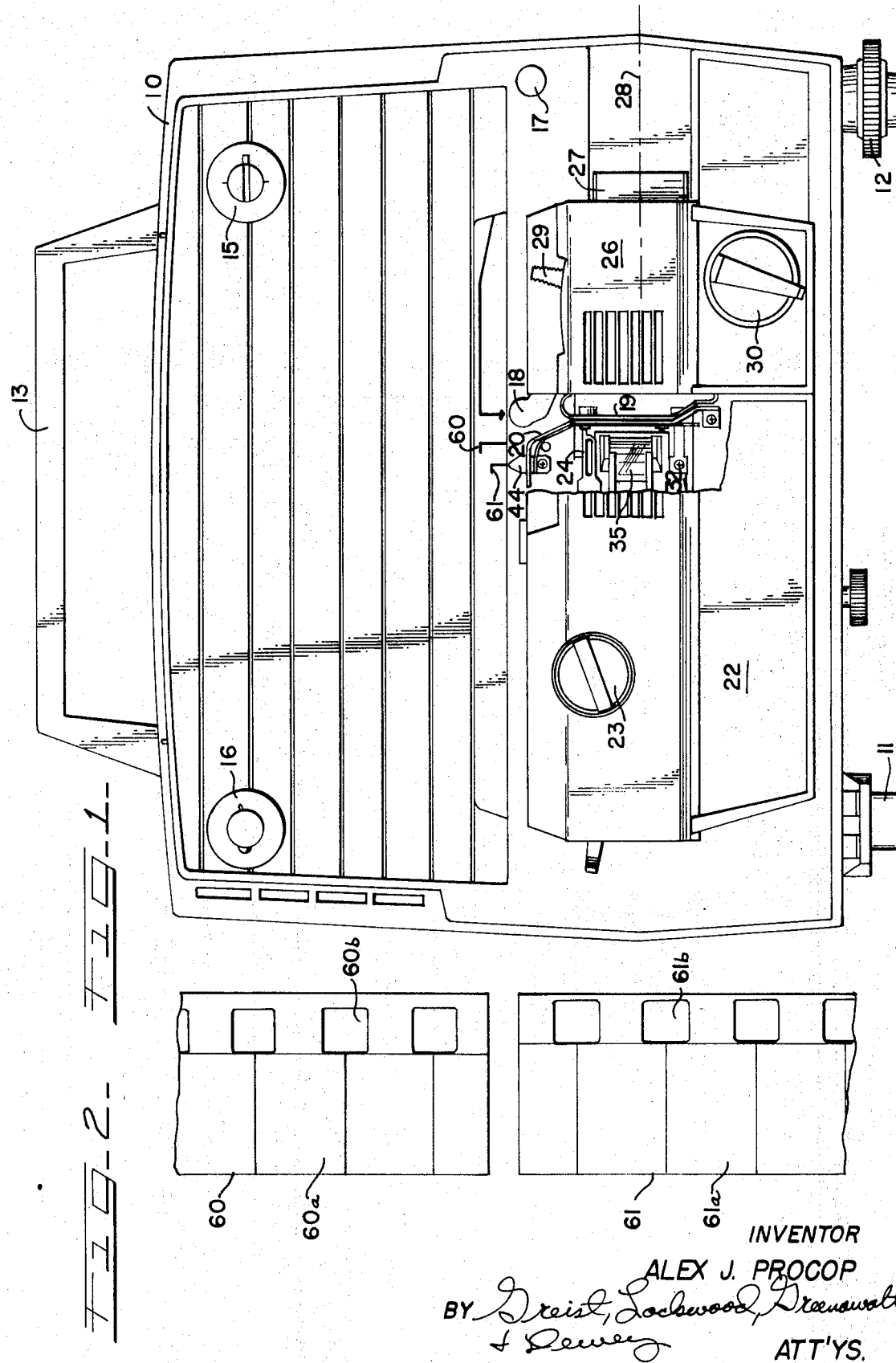
INVENTOR
ALEX J. PROCOP
BY Dreist, Lockwood, Greenawalt
& Dewey
ATT'YS.

Sept. 15, 1970           A. J. PROCOP           3,528,732
GATE CONSTRUCTION FOR A MOVING PICTURE PROJECTOR
Filed Sept. 19, 1966           2 Sheets-Sheet 2
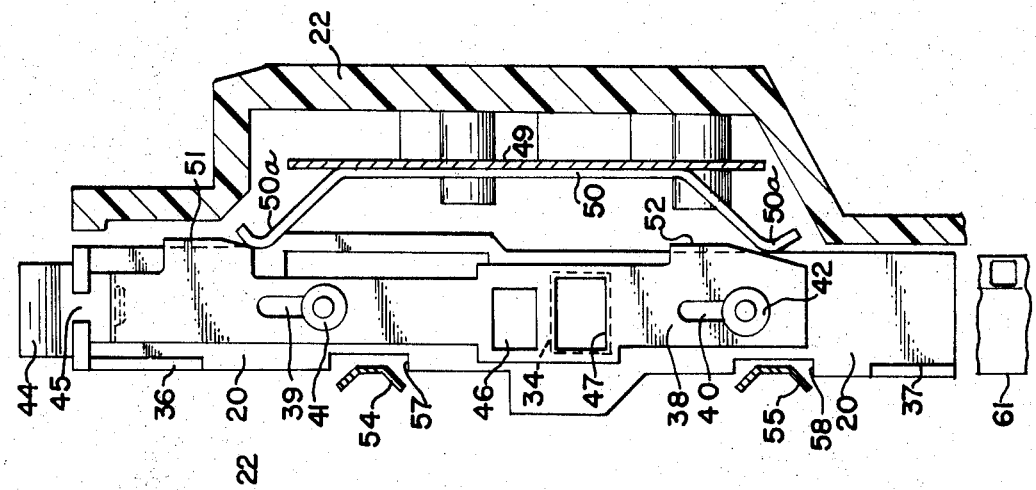
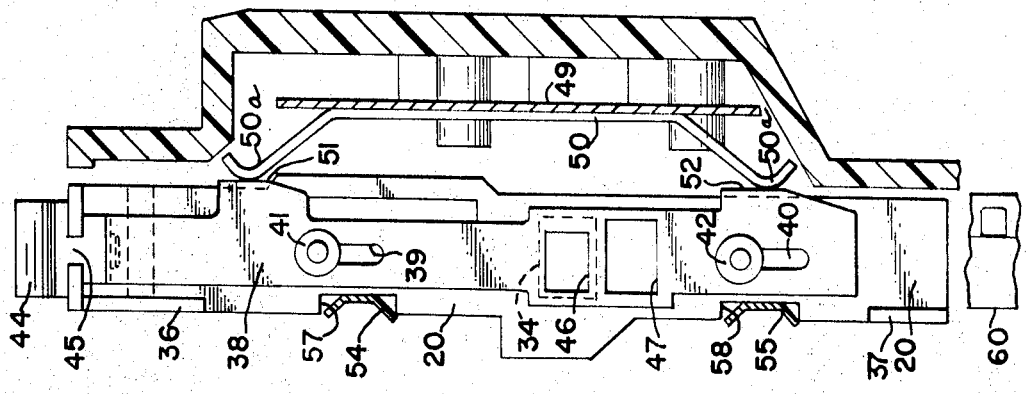
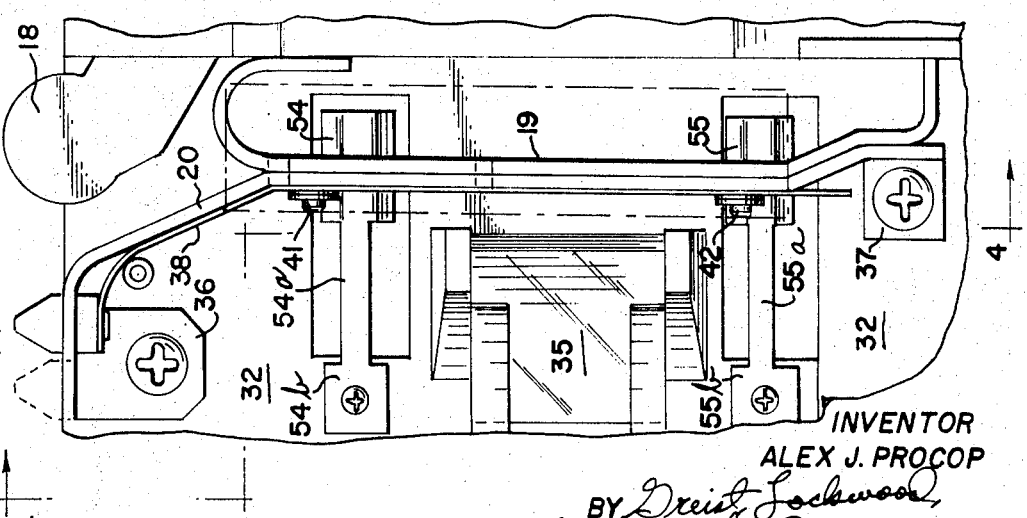
INVENTOR
ALEX J. PROCOP
BY Drew Lockwood,
Greenawalt & Dewey ATT'YS.

United States Patent Office 3,528,732
Patented Sept. 15, 1970

3,528,732
GATE CONSTRUCTION FOR A MOVING PICTURE PROJECTOR
Alex J. Procop, Northridge, Calif., assignor, by mesne assignments, to GAF Corporation, a corporation of Delaware
Filed Sept. 19, 1966, Ser. No. 580,245
Int. Cl. G03b 1/48
U.S. Cl. 352—224                    2 Claims

ABSTRACT OF THE DISCLOSURE

A masking plate is slidably mounted at the projection gate, this masking plate having a Super 8 aperture and a standard 8 aperture for being alternately aligned with the optical axis. Movement of the masking plate actuates guides which engage edges of the film for shifting either the standard 8 film or the Super 8 film laterally for proper alignment of respective apertures therein with the film drive claw.

---

This invention relates in a general way to gates for moving picture projectors, and more particularly the invention relates to a new and improved moving picture projector gate adapted for alternate reception of two forms of film having the same width but having different arrangements in image size and lateral spacing of claw apertures or perforations.

With the advent of Super 8 moving picture film, a need has arisen to adapt a moving picture projector to accommodate this film as well as standard 8 mm. film. Super 8 film has of course the same width as standard 8 mm. film. However, Super 8 film differs from standard 8 mm. film in two respects, viz., one, the width of the image or frame portions of the films, and two, the lateral spacing of the claw apertures or perforations from the adjacent film edge. In Super 8 film, the images or frames thereon have a width greater than the width of the images on standard film. Because of this increased width of the image portions of Super 8 film, the claw apertures or perforations are spaced somewhat nearer the adjacent film edge than in standard 8 mm. film.

In order to adapt a motion picture projector for proper handling of both standard 8 mm. and Super 8 film, a movable masking plate is required at the projection gate with a pair of apertures corresponding respectively in size, shape and orientation with the images on respective films. Also, means must be provided for shifting either of the films laterally to insure proper alignment of the projector drive claw with the claw apertures in both films. The present invention has to do with providing such features in a moving picture projector in a unique manner.

A primary object of the present invention is the provision of new and improved construction in a moving picture projection gate thereby adapting the same for alternate reception of two different films of the type described.

Another object of the present invention is the provision of new and improved moving picture gate construction adapting the same for alternate reception of different films of the type described, which construction includes a movably mounted masking plate and laterally shiftable film guide means actuated by movement of the former.

A more specific object of the present invention is the provision of new and improved motion picture gate construction thereby adapting the same for alternate reception of standard 8 film and Super 8 film, which construction provides for proper masking for each type of film and also provides for proper alignment of the claw apertures in each type of film with the drive claw of the projector.

These and other objects and advantages of the invention will become apparent from the following specification disclosing a preferred embodiment of the invention in the accompanying drawings wherein:

FIG. 1 is a side elevational view of a moving picture projector in which the present invention is incorporated, a portion of a housing plate on such projector being broken away for better illustration of the projection gate;

FIG. 2 is a plan view of a section of standard 8 mm. movie film longitudinally aligned with a section of Super 8 film to illustrate the differences in image or frame width and lateral spacing of claw apertures or perforations;

FIG. 3 is an enlarged, fragmentary, side elevational view of the projection gate of the projector, with the various parts being arranged to accommodate standard 8 mm. film;

FIG. 4 is a section taken along the line 4—4 of FIG. 3; and

FIG. 4A is a section similar to FIG. 4 and showing the arrangement of parts for accommodating Super 8 film.

Referring now to FIG. 1, a moving picture projector in which the present invention is incorporated includes a housing 10 supported on a pair of rear feet 11 and an adjustable front foot 12. The housing includes a carrying handle 13. Housing 10 supports a supply spindle 15 and take-up spindle 16 mounting respective supply and take-up reels (not shown) of the usual construction. Film from the supply reel on the spindle 15 is trained around a roller 17, then around a resiliently mounted buffer 18, then downwardly between front and rear aperture plates 19 and 20, respectively, which plates define the projection gate of the projector.

After the film has passed through the gate, the same is trained around one or more buffers and then through an exit slot mechanism (not shown) all contained within a removable housing panel 22. The film is secured to the hub of a take-up reel on the take-up spindle 16, which take-up reel is driven in the usual manner for wind-up of the film.

By way of further background, the moving picture projector illustrated includes a framing knob 23 which operates suitable cam mechanism to adjust the position of drive claw 24 thereby to achieve frame adjustment. The projector also includes a front panel 26 enclosing a lens assembly 27 mounted for movement longitudinally of the projector optical axis represented by the line 28, such movement of the lens assembly being accomplished by manipulating a lever 29. An operating knob 30 controls the motor and lamp of the projector.

A portion of cover panel 22 is broken away in both FIGS. 1 and 3 to illustrate the projection gate primarily consisting of the aforesaid aperture plates 19 and 20. A projector housing wall 32 mounts by suitable means a mirror 35 in a vertical plane arranged at a 45° angle with the optical axis represented by the line 38. This mirror reflects light from a projection lamp (not shown) and along a path represented by the line 28; this light passes through suitable aligned apertures in plates 19 and 20, the aperture in plate 20 being designated 34 and illustrated in FIGS. 4 and 4A.

Referring now to FIG. 3, rear aperture plate 20 will be seen to be mounted to projector wall 32 by means of a pair of brackets 36, 37 secured to such wall by suitable fasteners. Front aperture plate 19 is movably mounted by appropriate means (not shown) for being separated from the rear aperture plate 20 to permit threading of film between these plates. Front aperture plate 19 is shown positioned against the rear aperture plate 20 in FIG. 3, this being the position of the front aperture plate when film is being projected. One or both of the plates 19, 20 may be provided with a longitudinally extending relieved area thereby defining a channel for guiding the film through the gate.

The present invention includes a masking plate 38 slidably mounted against the rear surface of rear aperture plate 20. The plate 38 includes a pair of longitudinally extending slots 39 and 40 slidably receiving fasteners 41, 42, respectively, supported from the rear aperture plate 20. The upper end of masking plate 38 is connected to an actuating button 44, this button having opposed grooves adapting the same for sliding movement in a slot 45 provided in an upper, horizontally extending portion of the rear aperture plate 20. Movement of button 44 between the solid and broken line positions of FIG. 3 serves to raise and lower the masking plate between the positions thereof shown in FIGS. 4 and 4A. When button 44 is in the forward or solid line position illustrated in FIG. 3, masking plate 38 is located in its lower position (FIG. 4); when button 44 is slid rearwardly to its broken line position (FIG. 3), the masking plate 38 is lifted to its upper position (FIG. 4A).

As noted in FIGS. 4 and 4A, masking plate 38 includes a first rectangular shaped opening 46 and a second, larger, rectangular shaped opening 47. Opening 46 is substantially the same in size and shape as a single image or frame in standard 8 mm. film, whereas opening 47 is substantially the same in size and shape as a single aperture or frame of Super 8 film. When masking plate 38 is in its lower position as shown in FIG. 4, opening 46 is positioned on the optical axis for projection of standard film; when the masking plate is slid to its upper position shown in FIG. 4A, opening 47 is located along the optical axis for projection of Super 8 film.

As noted in FIGS. 4 and 4A, removable cover panel 22 mounts a partition plate 49, which plate in turn supports a vertically extending spring strip 50. This resilient strip has bent portions 50a at opposite ends thereof serving as yieldable stops or film guides. When masking plate 38 is in its lower or "Standard 8" position (FIG. 4) the yieldable stops or guides 50a are biased against camming surfaces 51 and 52 forming an integral part of the masking plate. One edge of the film engages and slides along the yieldable stops or guides 50a. A pair of springs 54 and 55 engage and push against the other edge of the film for urging the same toward the guides 50a.

As noted in FIG. 3, spring 54 has a stem portion 54a and an attaching portion 54b which receives a suitable fastener for securing the spring 54 against projector wall 32. In like manner, spring 55 includes a stem portion 55a and attaching portion 55b, the latter also being secured to the wall 32 by a fastener.

Referring back to FIG. 4, it will be seen that rear aperture plate 20 includes a pair of notches 57, 58 receiving respective springs 54, 55 to permit the requisite movement of the latter in pressing film against the guides or stops 50a. It will be understood that when the various parts are in the position shown in FIG. 4, the projector is adapted to accommodate standard 8 mm. film, a section of which is illustrated in FIG. 2 and designated by the numeral 60.

Standard 8 mm. film has images or frames 60a and a longitudinally extending series of claw apertures or perforations 60b. A section of Super 8 film is also shown in FIG. 2 in longitudinal alignment with the standard film 60. The Super 8 film 61 includes images or frames 61a which have the same longitudinal dimension as the images or frames 60a but which are greater in width than the latter. Super 8 film 61 has claw apertures or perforations 61a which are spaced nearer the adjacent edge of the film than the corresponding apertures 60b to accommodate the greater width of the images or frames 61a. It will be apparent that when it is desired to adapt the projector to accommodate Super 8 film 61, such film must be laterally shifted so as to bring the centers of the claw apertures 61b into proper lateral alignment with the drive claw 24 (shown only in FIG. 1).

Referring now to FIG. 4A, it will be observed that when the masking plate 38 is slid upwardly to bring the opening 47 into alignment with the optical axis for projection of Super 8 film, the camming surfaces 51, 52b on the masking plate are slid away from the guides or stops 50a allowing the latter to spring to the left and into engagement with edge portions at the rear aperture plate 20. This movement of the guides or stops 50a will cause movement or shifting of the film to the left so as to bring the claw apertures 61b into proper lateral alignment with the drive claw 24. The springs 54, 55 engage the other edge of the Super 8 film for pressing or holding the same against the stops 50a.

When it is desired to adapt the projector for projection of standard 8 film, button 44 is slid forwardly thereby lowering the masking plate and bringing camming surfaces 51, 52 into engagement with the stops 50a. This movement of the masking plate cams the stops 50a to the right allowing the springs 54, 55 to cause shifting or positioning of the film 60 to the right for proper alignment of the claw apertures 60b. It will be apparent that movement of the masking plate results in simultaneous locating of the proper openings 46, 47 in the optical axis and shifting of the film guides so that the film being used will be properly engaged by the projector drive claw.

As noted in FIG. 1, suitable indicia 60, 61 may be provided on the projector housing adjacent the button 44 for indicating respective standard 8 and Super 8 positions for the same. Thus, by means of the present invention, simply moving the button 44 results in adapting the gate of the projector for alternate reception of standard 8 and Super 8 film.

While the invention has been shown in but one form, it will be obvious to those skilled in the art that it is not to be so limited. On the contrary, the invention is susceptible of various forms and modifications without departing from the spirit and scope of the appended claims.

I claim:

1. In a projection gate for a moving picture projector, the construction adapting the gate for alternate reception of first and second film having the same width, the second film having its image portion of greater width than the width of the image portion of the first film, and the second film having the claw apertures thereof spaced nearer the adjacent film edge than the corresponding claw aperture to adjacent edge spacing of the first film, said construction comprising, an aperture plate fixed in the projector and having a projection aperture on the optical axis of the projector, which aperture is of a size, shape and orientation permitting projection of both of said films, a masking plate slidably mounted in parallel adjacent relation with said aperture plate for movement between first and second positions, said masking plate having a first and a second opening therein generally the same in size, shape and orientation as the images of respective first and second films at the projection gate, said masking plate in said first position serving to locate said first opening on the projector optical axis for projection of said first film, and said masking plate in said second position thereof serving to locate said second opening on the projector optical axis for projection of said second film, and movable film edge guide means at the gate, which guide means are actuated by movement of said masking plate for shifting either of the films laterally such that the path described by movement through the gate of the claw aperture centers of the first film is collinear with the path described by movement through the gate of the claw aperture centers of the second film, said guide means including resilient stop means arranged to engage one film edge and spring means arranged to press against the other film edge, said masking plate including a cam surface along one edge thereof arranged to engage said stop means when the masking plate is in one of said positions thereof for camming said stop means away from the film edge whereupon said spring means serves to shift the film laterally in one direction, movement of said masking plate to its other position serving to permit said stop means to bias the film laterally in the other direction.

2. The construction according to claim 1 wherein said stop means is formed of spring material.

References Cited

UNITED STATES PATENTS

| 1,846,049 | 2/1932 | Dina | 352—221 X |
| 3,136,209 | 6/1964 | Briskin et al. | 352—224 X |
| 3,439,980 | 4/1969 | Teshi | 352—79 |

NORTON ANSHER, Primary Examiner

M. H. HAYES, Assistant Examiner

U.S. Cl. X.R.

352—79